United States Patent [19]

Hipchen et al.

[11] 4,118,533
[45] * Oct. 3, 1978

[54] STRUCTURAL LAMINATE AND METHOD FOR MAKING SAME

[75] Inventors: Donald E. Hipchen, Seminole; Michael J. Skowronski; Joseph R. Hagan, both of Clearwater, all of Fla.

[73] Assignee: Celotex, Tampa, Fla.

[*] Notice: The portion of the term of this patent subsequent to Jun. 7, 1994, has been disclaimed.

[21] Appl. No.: 649,976

[22] Filed: Jan. 19, 1976

[51] Int. Cl.² .............................................. B32B 5/20
[52] U.S. Cl. .................................... 428/297; 156/79; 156/309; 156/555; 264/45.1; 428/113; 428/156; 428/302; 428/303; 428/313; 428/426; 428/457; 428/920
[58] Field of Search ............... 156/78, 79, 309, 555; 260/2.5 AK; 428/297, 302, 303, 313, 317, 321, 322, 325, 332, 423, 424, 425, 160, 910, 920, 164, 426, 158; 264/45

[56] References Cited

U.S. PATENT DOCUMENTS

| | | | |
|---|---|---|---|
| 3,269,882 | 8/1966 | Willy | 156/78 |
| 3,355,535 | 11/1967 | Hain et al. | 156/78 |
| 3,554,851 | 1/1971 | Modigliani | 428/317 |
| 3,578,544 | 5/1971 | Thorsrud | 428/317 |
| 3,627,613 | 12/1971 | Stolki | 156/309 |
| 3,657,036 | 4/1972 | Mullenhoff et al. | 156/79 |
| 3,804,931 | 4/1974 | Miller | 156/79 |
| 3,814,659 | 6/1974 | Nadeau | 428/313 |
| 3,903,346 | 9/1975 | DeLeon et al. | 156/79 |
| 3,960,999 | 6/1976 | Massie | 428/313 |
| 4,028,158 | 6/1977 | Hipchen et al. | 156/79 |

Primary Examiner—James J. Bell
Attorney, Agent, or Firm—Littlepage, Quaintance, Murphy, Richardson and Webner

[57] ABSTRACT

A structural laminate comprises at least one planar facing sheet with a rigid foam attached to one surface of the facing sheet. The rigid foam is characterized in that the major recurring chemical linkage therein is the isocyanurate moiety. Distributed substantially evenly throughout the foam is a mat of long straight glass fibers arranged in layers substantially parallel to the facing sheet. The process for producing this structural laminate comprises the steps of contacting a thin, substantially incompressible yet expansible mat of long straight glass fibers with a foam-forming mixture of an organic polyisocyanate and a diol, positioning a facing sheet on each face of the mat, and passing the facing sheets having the mat and the foam-forming mixture there between through the nip of two rotating rolls.

48 Claims, 5 Drawing Figures

STRUCTURAL LAMINATE AND METHOD FOR MAKING SAME

BACKGROUND OF THE INVENTION

1. Field of the Invention

This invention relates to structural laminates and foam filled sheet products and more particularly it relates to structurally rigid sheets of foam having a glass fibers distributed substantially evenly throughout the foam. It also relates to a method for forming such a product.

2. Description of the Prior Art

Many attempts have been made to create structural laminates particularly of foamed resins to be used as low density thermal insulation and particularly decorative wall and ceiling panels in metal buildings. Before laminates of this type can be used, however, it is necessary that they meet certain fire safety standards. In particular, when installed in a structure, the material of the laminate when subjected to an open flame should not produce a self-propagating fire within the limits of the structure as evidenced by flaming or material damage. See "Acceptable Performance Criteria, Factory Mutual Building Corner Fire Test Procedure."

Recently a new generation of polymer foam materials have appeared in which the isocyanurate moiety is the major recurring chemical unit. These materials have much greater stability and resistance to heat than do previous foamed resins such as the polyurethanes. Further, the resistance is achieved without the use of any significant amounts of fire retardant additives. The smoke generated by combustion of these materials is much smaller in volume than that generated by combustion of an equivalent amount of other foams and is relatively free of toxic components typically generated by combustion of conventional halogen and/or phosphorus containing fire retardant additives. An example of a laminate of this type using polyisocyanurate as core material is to be found in U.S. Pat. No. 3,814,659. The discussion concerning the foam core found in Columns 4 and 5 of that patent is particularly noteworthy.

While it has been recognized that polyisocyanurates have some superior qualities to previously known foams, common difficulties with other foams still remain, particularly, the flammability of the foam when subjected to a fire of sufficient intensity and heat. Sudden exposure to conditions of high temperature and open flame is known to result in surface charring of a polyisocyanurate foam which tends to limit the surface spread of flame and retard the involvement of the subsurface foam. However, local structural failure of the foam under these exposure conditions frequently leaps to increased surface exposure, total involvement of the foam core and a self-propagating fire.

It is therefore an object of this invention to create a structural laminate having superior fire resistant properties which would qualify for approval by the Factory Mutual Research Corporation, an independent risk certification firm.

It is a further object of this invention to form a structural laminate utilizing a superior polyisocyanurate resin with a mat of long straight glass fibers to form a unique laminated thermal insulation of superior performance and of pleasing appearance.

Previous attempts to make similar structures utilizing foams other than polyisocyanurate have relied on the spongy character of a high loft batting into which a foam-forming resin was forced and then permitted to foam and expand at the same rate as the high loft fibrous batting material expanded. An example of this process applied to making a flexible foam filled batting material can be found in U.S. Pat. No. 3,617,594.

A distinct disadvantage is presented by using a high loft batting in that the batting may elastically recover faster than the foam forming mixture expands thereby producing voids or pockets within the resultant material, the pockets contributing directly to possible structural failure of the material when subjected to high heat conditions.

It is therefore an object of this invention to form a structural laminate using a low loft mat of long straight glass fibers, the mat being thin, substantially incompressible, yet expansible under the sole influence of the expansion of a foam-forming mixture which penetrates and completely fills the interstices between the fibers of the mat.

A method of making a low loft mat which satisfies the functional and structural requirement of this invention is to be found in U.S. Pat. No. 2,609,320 provided certain limitations are placed on the method. For example, in a mat acceptable for use in a laminate according to this invention, the glass fibers are attached to one another by an amount of fiber binder sufficient to make the mat of glass fibers dimensionably stable but insufficient to fill the interstices between the glass fibers. Preferably only a minimum amount of this fiber binder should be employed. Further the mat should not be expanded or puffed up in thickness as it taught in U.S. Pat. No. 2,609,320 but rather should be of low loft such that pressured applied to the faces of the mat will not substantially reduce the thickness of the mat and such that the mat does not elastically recover to any appreciable amount when the structure is released from the faces of the mat. Of course, any other method can be used which would result in a batt of glass fibers having a structure substantially the same as that produced by the method of U.S. Pat. No. 2,609,320 with these restrictions.

SUMMARY OF THE INVENTION

The structural laminate of the present invention has at least one but preferably has two facing sheets, one on either side of the foam core. These facing sheets can be constructed of a wide variety of non-flammable materials such as asbestos, glass fibers, or metals. In the broadest aspects of the invention, any metal can be employed such as copper, brass, iron, steel, or aluminum. Aluminum is the preferred metal because of its ductility and ease with which it can be manufactured into a material of suitable thickness.

Attached to one surface of the at least one facing sheet is a rigid foam formed from a foam-forming mixture. The foam-forming mixture is one which will result in a rigid foam characterized in that the major recurring chemical linkage therein is the isocyanurate moiety. The foam-forming mixture of the present invention comprises an organic polyisocyanate and a diol.

In the broadest aspect of the present invention, any organic polyisocyanate can be employed. The preferred organic polyisocyanate is polymethylene polyphenylisocyanate having the indicated functionality and indicated equivalent weight. Those polymethylene polyphenylisocyanates having a functionality of less than 2.1 are generally not acceptable because the resultant foams exhibit an undersirably high friability. The polymethylene polyphenylioscyanates of the present invention generally have a functionality of at least 2.1 and preferably 2.5 to 3.8.

Polymethylene polyphenylisocyanates having an equivalent weight less than 120 tend to produce foams having too great a friability. Those having an equivalent weight greater than 180 are generally too viscous to make their use practical. Therefore, the polymethylene polyphenylisocyanates employed in the present invention generally have an equivalent weight between 120 and 180 and preferably have an equivalent weight between 130 and 145. The friability is generally less than 30%, preferably less than 20%.

A preferred subclass of polymethylene polyphenylisocyanates especially useful in the present invention are a mixture of those of Formula I:

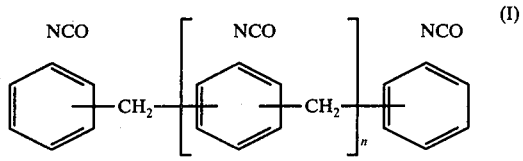

wherein $n$ is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of Formula I, wherein $n$ is 1 as well as mixtures wherein $n$ can have any value from 0 to 8 as long as the mixture has the specified equivalent weight. One such mixture has 40 weight percent of $n = 0$, 22 weight percent of $n = 1$, 12 weight percent of $n = 2$, and 26 weight percent of $n = 3$ to about 8. The preferred polymethylene polyphenyl isocyanates are described in U.S. application Ser. No. 322,843 filed Jan. 11, 1973 now abandoned. The synthesis of polymethylene polyphenylisocyanates is described in Seeger et al., U.S. Pat. No. 2,683,730 and in Powers U.S. Pat. No. 3,526,652 at Column 3, Lines 6-21. It should, therefore, be understood that the polymethylene polyphenylisocyanate available on the market under the tradenames of PAPI-20 (Upjohn) and E-418 (Mobay) can successfully by employed within the spirit and scope of the present invention.

In the broadest aspects of the present invention, any diol having a low equivalent weight generally between 30 and 100, and preferably between 30 and 70, and having two hydroxyl groups which pass the Zerewitinoff Test, can be employed in the present invention. Triols and higher polyols can be admixed with those diols in minor amounts generally less than 40 percent provided the equivalent weight of the mixture is within the specified range. The preferred diols are those of Formula II:

HO—R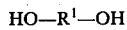—OH  (II)

wherein $R^1$ is selected from the group consisting of lower alkylene and lower alkoxyalkylene with at least two carbon atoms. Examples of suitable diols include, among others, ethylene glycol, 1,2-propanediol, 1,3-propanediol; 1,4-butanediol; diethylene glycol, dipropylene glycol, dimethylol diclopentadiene, 1,3-cyclohexanediol; and 1,4-cyclohexanediol. Diethylene glycol is preferred since it gives a core of minimum friability and optimum facer sheet adhesion.

In order to ensure complete reaction, the polymethylene polyphenylisocyanate and the diol are generally mixed in an equivalent ratio of 2:1 to 6:1 and preferably 3:1 to 5:1. In ranges outside these proportions the reaction yields a product having undesirable physical characteristics. At higher ratios the product has an undesirably high friability. At lower ratios the product has an undesirably high flammability.

Any catalysts known to catalyze the trimerization of isocyanates to form isocyanurates can be employed in the present invention as long as they give cream times of 15 to 30 seconds and firm times to 25 to 60 seconds. One preferred type of catalyst is a mixture of equivalent amounts of 2,4,6-tris(trimethylaminomethyl)phenol and potassium-2-ethyl hexoate, the synthesis and use of which is described in U.S. application Ser. No. 322,842 filed Jan. 11, 1973. Another catalyst system is that employing an epoxide, and N-substituted aziridine, and a tertiary amine. The synthesis and use of such a catalyst is described in U.S. application Ser. No. 251,279 filed May 8, 1972, now U.S. Pat. No. 3,799,896.

The catalysts in the present invention are employed in an amount necessary to give the desired cream times and firm times and generally comprise from 0.1 to 20, and preferably from 0.3 to 10, weight percent of the total composition.

Any blowing agent characteristically employed in similar prior art products can be employed in the composition of the present invention. In general, these blowing agents are liquids having a boiling point between minus 50° C. and plus 100° C. and preferably between 0° C. and 50° C. Examples of suitable blowing agents include, among others, chlorinated and fluorinated hydrocarbons such as $CCl_2F — CClF_2$, $CCl_2F — CF_3$ and fluorotrichloromethane which is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperatures until mixed with the other components.

Successful results have been obtained with silicone-/ethylene-oxide/propylene-oxide copolymers as surfactants. The surfactant molecules act as nucleating points from which bubbles can be initially formed and they further stabilize the bubbles after formation to allow preparation of foam. Among the many surface-active materials mentioned in the patent literature as cell-size control agents and stabilizers for urethane foams are alkoxy silanes, polysilylphosphonates, polydimethyl siloxane and polydimethylsiloxane-polyoxyalkylene block copolymers. For a more detailed explanation of the function of the surfactant in the manufacture of foamed polyurethane and polymethylene polyphenylisocyanate compounds, reference is made to an article entitled "How Silicone Surfactants Affect Polyurethane Foams" in *Modern Plastics*, January, 1967 edition, Pages 133*ff*, of which Robert J. Boudreau is the author. Other surfactants useful in the present invention include the liquid reaction products obtained from the polymerization of a monomeric system consisting of or comprising N-vinyl pyrrolidone is a polyol polymerization medium. The synthesis and use of such surfactants is described in Example 2 of U.S. Pat. No. 3,746,663.

Examples of surfactants useful in the present invention include, among others polydimethylsiloxane-polyoxyalkylene block copolymers available from the Union Carbide Corporation and the tradenames "L-5420" and "L-5340" and from the Dow Corning Corporation under the tradename "DC-193" and N-vinyl pyrrolidone copolymer compositions available from the Air Products and Chemicals, Inc. under the tradenames "LK-221" and "LK-443". The surfactant generally comprises from 0.05 to 4, and preferably comprises from 0.1 to 2, weight percent of the composition.

The structural laminates of the present invention include a mat of long straight glass fibers. The fibers of the mat are arranged in layers which are distributed substantially evenly throughout the rigid foam, each layer being substantially parallel to the facing sheet and the rigid foam completely filling the interstices between the glass fibers of the mat. The glass fibers are generally straight and not crimped, crinkled, or the like. The glass fibers are not short but rather long, generally having a length greater than one foot and preferably 5 to 12 feet. Intermingled with the glass fibers is a relatively minor proportion of a binder, preferably a silane modified polyester binder amounting to about 2 to 10 percent by weight of the combined glass fiber and binder. The glass fiber mat having this amount of fiber binder is dimensionally stable yet is expansible under the influence of the expansion of any foam-forming mixture caused to penetrate into the interstices between the fibers of the mat.

The glass fiber mat is incorporated into the structural laminate in an amount which will insure the continued structural integrity of the laminate when it is exposed to high temperature and open flames yet not so much as to result in the deterioration of the surface of the structural laminate due to exposed single fibers. The glass fiber mat is functionally effective when included in the range of 4–24 gms/board foot of structural laminate. A structural laminate preferably comprises 6–20 gms of glass fiber mat per board foot of structural laminate.

A particularly suitable process for producing a structural laminate according to this invention comprises the steps of contacting the previously formed, thin, substantially incompressible yet expansible mat of long straight glass fibers with a foam-forming mixture as outlined above, placing a facing sheet in contact with at least one face of the mat, and passing the facing sheet, mat and foam-forming mixture between the nip of two rotating rolls thereby forcing the foam-forming mixture into the interstices between the glass fibers of the mat. The facing sheet, mat, and foam-forming mixture then passes into an expansion zone wherein the foam-forming mixture expands under the influence of heat generated in exothermic reaction between the components of the foam-forming mixture. The layers of the fibers in the mat separate under the influence of the expansion of the foam-forming mixture and are distributed throughout the foam but maintain their same relative order. The foam-forming mixture having the glass fibers distributed substantially evenly therethrough is subjected to the influence of heat controlably added by the circulation of hot air between 150° F. and 250° F. and cured to a rigid foam structural laminate. This rigid structural laminate is then periodically severed into finite lengths thereby forming discrete panels.

DESCRIPTION OF THE PREFERRED EMBODIMENTS

Figure 1:
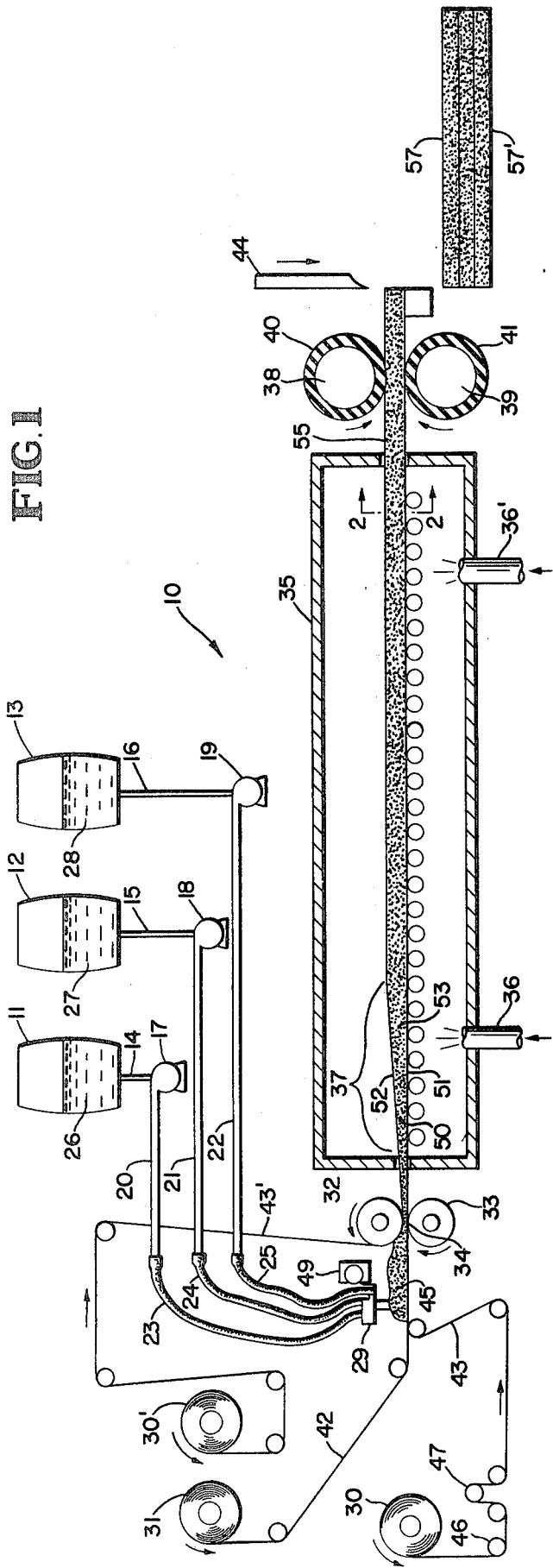
FIG. 1 is schematic representation of an apparatus suitable for practicing the process of the present invention.

In FIG. 1 there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower facing sheet material 43, a roll 30' of upper facing sheet material 43', and a roll 31 of glass fiber mat material. The apparatus 10 is also provided with metering rolls 32 and 33 and an oven 35 provided with vents 36 and 36' for introducing and circulating hot air. The apparatus 10 is also provided with pull rolls 38 and 39 each of which preferably has a flexible outer sheath 40 and 41. The apparatus 10 is also provided with cutting means 44 for severing the structural laminate produced by this process into finite lengths thereby producing discrete panels.

In operation, the isocyanate tank 11 is charged with the organic polyisocyanate admixed with the blowing agent 26 and the surfactant 27, the polyol tank 12 is charged with the polyol, and the catalyst tank 13 is charged with the catalyst composition 28. The speeds of the pumps 17, 18, and 19 are adjusted to give the desired ratios of the ingredients in the tanks 11, 12, and 13. These ingredients pass respectively through line 20, 21, and 22 as well as lines 23, 24, and 25 where upon they are mixed in the mixing head 29 to form the foam-forming mixture 45 which contacts the thin, substantially incompressible yet expansible mat of glass fibers 42 fed from the roll of glass fiber mat 31 toward the nip 34 between the two rotating metering rolls 32 and 33.

By virtue of rotation of the pull rolls 38 and 39, the lower facing sheet 43 is pulled from the roll 30, the upper facing sheet 43' is pulled from the roll 30', and the glass fiber mat 42 is pulled from the roll 31. The facing sheets 43 and 43' having the mat 42 and foam-forming mixture 45 there between pass through the nip 34 of the two rotating metering rolls 32 and 33. The mixing head 29 is caused to move back and forth, normal to the plane of the paper by virtue of a reciprocating means 49. In this manner, an even amount of foam-forming mixture 45 can be maintained upstream from the nip 34 and in contact with the mat of glass fibers 42. The mat of glass fibers being substantially incompressible yet expansible has such a low loft that the pressure applied to the mat 42 by the rotating rolls 32 and 33 does not substantially reduce the thickness of the mat 42 but rather the foam-forming mixture 45 is caused to penetrate and completely fill the interstices between the glass fibers forming the mat 42. Further the mat 42 is of such a low loft that after passing through the nip 34 the glass fibers do not themselves elastically recover but expand under the sole influence of the expansion of the foam-forming mixture 45. The velocity of the mat 42 as it passes between the nip of the two rolls substantially equals the velocity of the facing sheets 43 and 43'. After passing between the nip of the two rolls 32 and 33, the composite structure 48 now comprises a lower and upper facing sheet 43 and 43' having therebetween a glass fiber mat 42 completely permeated by the foam-forming mixture 45 which wets the glass fibers of the mat 42.

This composite structure 48 now passes into oven 35 and while in the oven 35 the foam-forming mixture expands in an expansion zone 37. This expansion is initiated by heat generated in an exothermic reaction between the components 26, 27, and 28 of the foam-forming mixture 45 and is regulated by heat added to the oven 35 by the hot air from vent 36. The temperature within the oven 35 is controlled by varying the temperature of the hot air from vent 36 and 36' in order to insure that the oven temperature is maintained within the desired limits of 150° F. to 275° F. and preferably 175° F. and 250° F. While in the expansion zone 37 the layers of fibers 50 of the glass fiber mat separate under the influence of the expanding foam 53 in such a manner as to be evenly distributed throughout the foam 53 in planes substantially parallel to the plane of the facing sheets 51 and 52.

The foam 53, under continuing influence of the heat added to the oven 35 by the controlled introduction of hot air from vent 36 and 36', cures to form the structural laminate 55 of this invention. The structural laminate 55 then leaves the oven 35, passes between the pull rolls 38 and 39, and is cut by cutting means 44 into finite lengths thereby forming discrete panels 57 and 57' of the structural laminate 55.

Figure 4:
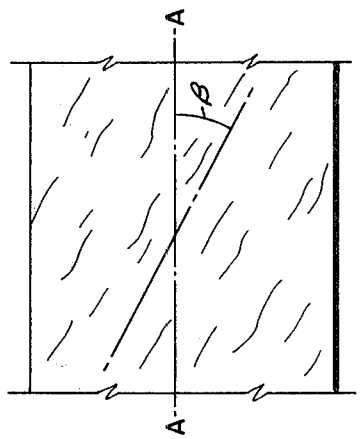
FIG. 4 is plan view of the structural laminate of FIG. 2 taken along the line 4—4 of FIG. 2.
Figure 2:
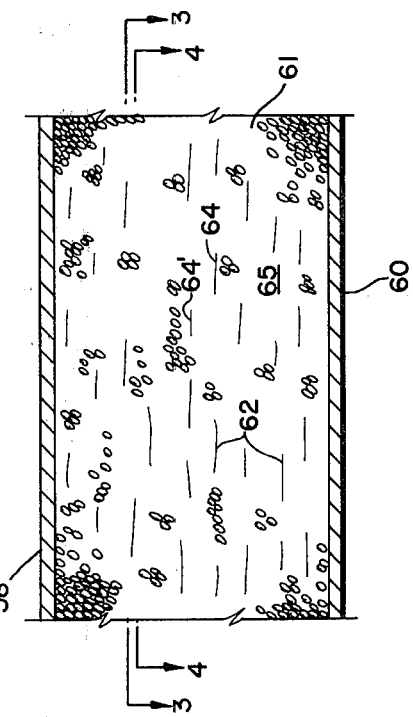
FIG. 2 is an enlarged sectional view of a structural laminate taken along line 2—2 of FIG. 1.
Figure 3:
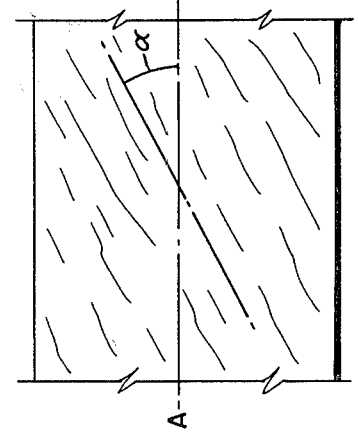
FIG. 3 is plan view of the structural laminate of FIG. 2 taken along the line 3—3 of FIG. 2.

In FIG. 2 there is shown an enlarged sectional view of a structural laminate 55 of the present invention taken along line 2—2 of FIG. 1. The structural laminate 55 shown in FIG. 2 comprises two facing sheets 58 and 60. It will be appreciated by persons of ordinary skill in the art that a structural laminate of this type can be made in such a manner as to only have a single facing sheet, or one of the facing sheets 58 or 60 can be removed from the structural laminate without seriously degrading the desired functional performance. The structural laminate 55 shown in FIG. 2 further comprises a rigid foam 61 formed from the foam-forming mixture 45 of FIG. 1. Distributed substantially evenly throughout the foam 61 is a multitude of long straight glass fibers 62 arranged in layers 64 64' which are substantially parallel to the facing sheets 58 and 60. The rigid foam 61 completely fills the interstices 65 between the glass fibers 62. The glass fibers in each layer 64, 64' are at an acute angle to the glass fibers in each next adjacent layer. This is shown schematically by examining two adjacent sections, the first along line 3—3 and shown in FIG. 3 and the second along line 4—4 shown in FIG. 4. In the two FIGS. 3 and 4, a plan view of the structural laminate of FIG. 2 is shown with reference lines A—A representing the same direction in the two figures. In FIG. 3 the glass fibers 62 are shown to be running predominantly at an angle α to the reference line A—A while in FIG. 4 the glass fibers 62 are shown to be running predominantly at an angle β with respect to reference line A—A. The fibers in these two adjacent layers represented by the sections shown in FIGS. 3 and 4 are aligned such that the fibers in one layer are at an angle of α plus β with respect to the fibers in the next adjacent layer. The angle α plus β is generally at an acute angle and is typically less than 60° in a structural laminate produced according to this invention. While the glass fibers 62 are generally long and straight, that is not crimped or twisted, the fibers 62 become slightly undulated within the plane layers 64, 64' which are substantially parallel to the facing sheet or sheets 58, 60 of the structural laminate 55. The slight undulations are induced in the fibers 62 as the foam-forming mixture 45 expands and disperses the fibers 62 throughout the laminate 55. The overall thickness "d" of a laminate 55 produced according to this invention is typically from 0.4 to 2.0 inches while the initial thickness of the glass fiber mat 42 is less than 0.1 inches and more typically 0.010 to 0.050 inches. The initial thickness of the glass fiber mat 42 is generally less than 1 and ½ times the separation of the facing sheets at the nip 34 of the two rotating rolls 32 and 33, the low loft of the mat 42 preventing any substantial compression by the two rolls 32 and 33.

EXAMPLE 1

A structural laminate was produced according to this invention by contacting a mat of glass fibers with a foam-forming mixture. The mat of glass fibers was substantially incompressible and had an overall thickness of 0.030 inches. The glass fibers forming the mat were long, straight fibers having an average diameter of less than 25 microns and lengths varying from 5 to 12 feet with an average length of over 5 feet. The ingredients of the foam-forming mixture were arranged in three tanks as follows:

| | |
|---|---|
| In tank 11: | |
| polymethylenepolyphenyl isocyanate sold under the trademark "PAPI-20" from Upjohn Chemical Company | 100 parts |
| fluorotrichloromethane | 18.8 parts |
| polydimethylsiloxane polyoxyalkene copolymers sold as L-5340 available from Union Carbide | 2.16 parts |
| In tank 12: | |
| diethylene glycol | 8.3 parts |
| In tank 13: | |
| 2, 4, 6-tris (dimethylaminomethyl) phenol sold as DMP-30 from Rohn & Haas Company | 0.84 parts |
| potassium-2-ethyl-hexoate | 1.75 parts |
| polyoxyethylene glycol (m.w. 200) sold as Carbowax 200 from Union Carbide Company | 7.41 parts |

The pull rolls are than started as are the pumps which deliver the contents of the tanks 11, 12, and 13 to the mixing head 29 in a weight ratio of 100:6.87:3.04. This corresponds to an equivalent ratio of isocyanate to diethylene glycol of 4.6:1. The contents of tank 11 are maintained at 65° F., whereas the contents of tanks 12 and 13 are at 65°-75° F. The foam-forming mixture completely fills the interstices between the individual fibers of the glass fiber mat wetting the individual fibers of the glass fiber mat. Two facing sheets of aluminum foil, each having a thickness of about 0.0015 inches are positioned one on each side of the glass fiber mat and foam-forming mixture, one of the facing sheets having an embossed decorative surface design. The facing sheets having the mat and foam-forming mixture therebetween then pass through the nip 34 of the two rotating rolls into oven 35 maintained at a temperature of 225° F. where the foam-forming mixture expands in the expansion zone 37 to a substantially uniform thickness of one inch, the glass fiber mat being included at the rate of 9.5 grams of glass fiber per board foot of laminate produced. The structural laminate produced according to this example was given the name CELOTEX TECHNIFOAM-600 THERMAX INSULATION BOARD.

EXAMPLE 2

A structural laminate made according to this invention and given the name CELOTEX TECHNIFOAM-600 THERMAX INSULATION BOARD was subjected to the Factory Mutual Building Corner Fire Test. This test is designed to evaluate the burning characteristics of interior finish materials and is designed and constructed with special physical proportions to simulate an actual fire within the corner of a building. The purpose of the test is to demonstrate the true fire hazard of wall and ceiling construction materials under typical building fire environments. The physical dimensions of the test structure are designed to eliminate all questions that are inherent in small reduced scale tests.

Figure 5:
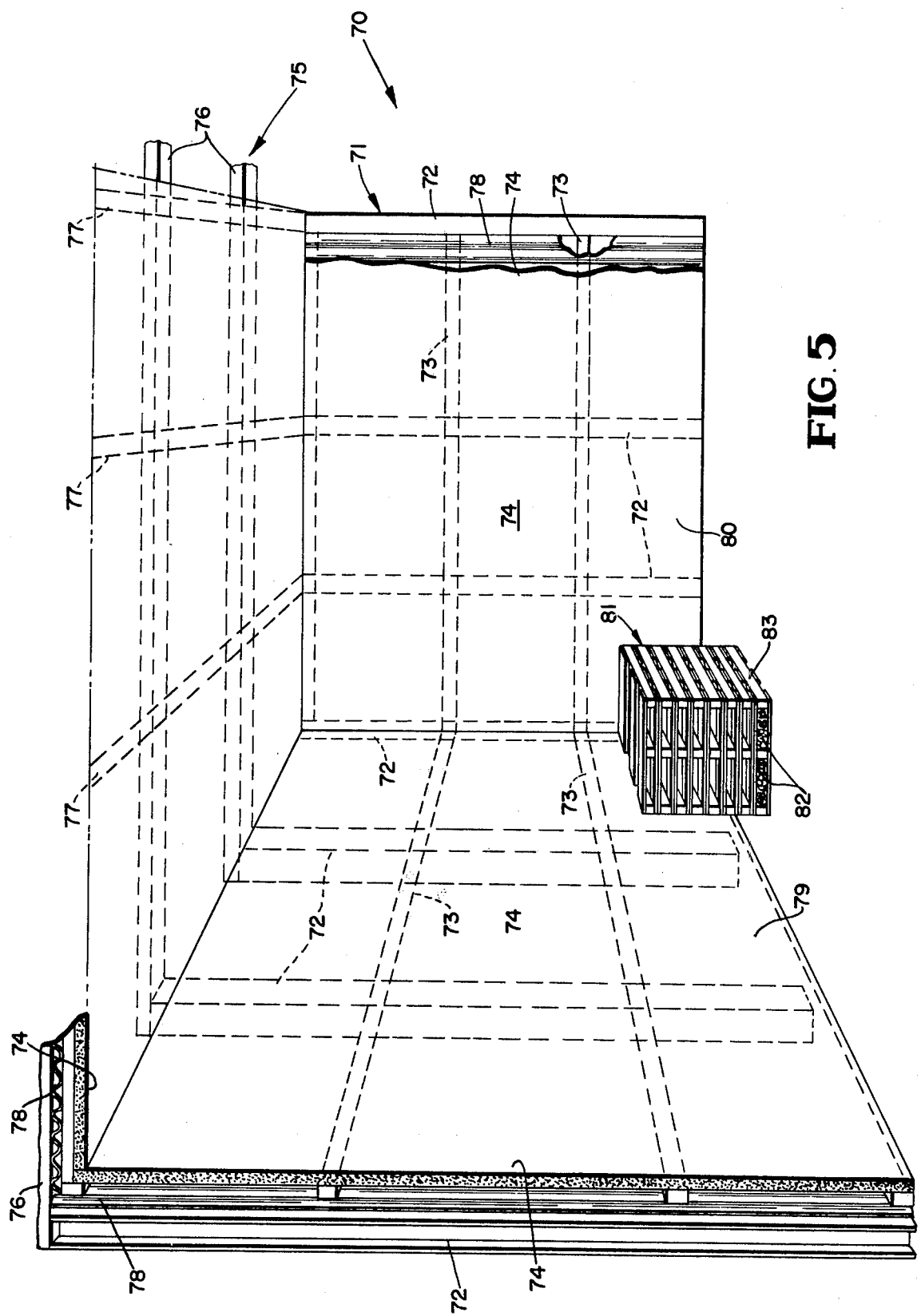
FIG. 5 schematic representation of the test structure for the Factory Mutual Building Corner Fire Test performed on selected materials made according to this invention.

As shown in FIG. 5, the test structure 70 comprises a free standing structural steel frame 71 made of supporting columns 72 and horizontal girts 73 designed for attachment of the material 74 to be tested. The roof or ceiling of the frame work 75 consists of bar joists 76 and metal furing strips 77. Corrugated steel sheeting 78 is installed on the inside of this metal structure. The wall 79 is 50 feet in length while wall 80 is 37 and ¾ feet in length. Both walls 79 and 80 are 24 and ¾ feet high.

The panels of the laminated structure 74 are secured to the inside of the corrugated steel while sheets of gypsum board (not shown) were installed behind the corrugated steel 78 to help contain the heat in the area.

The fire exposure was a 5 foot high pile of 4 by 4 foot wood pallets 81 weighing about 750 pounds. Ignition was achieved with the aid of two heptane-soaked cotton rolls 82 placed inside the bottom pallet 83. The stack of wood pallets 81 was located 1 foot away from each wall 79 and 80. When ignited the exposure is arranged to simulate the ASTM Time/Temperature curve for a minimum of 15 minutes producing 1000° F. in 5 minutes or less.

If the material 74 does not produce a self propagating fire within the limits of the structure as evidenced by flaming or material damage, the material being tested is considered acceptable. When tested in this manner, samples of CELOTEX TECHNIFOAM-600 THERMAX INSULATION BOARD as given in Example 1 were deemed acceptable even when not protected by automatic sprinklers.

Although the invention has been described in considerable detail with reference to certain preference embodiments thereof, it will be understood that variations and modifications can be effected within the spirit and scope of the invention as described above and as defined in the following claims.

What is claimed is:

1. A process for producing a structural laminate comprising the steps of:
   I. contacting a thin, substantially incompressible yet expansible mat of glass fibers with a foam-forming mixture comprising:
      A. an organic polyisocyanate, and
      B. a diol having an equivalent weight between 30 and 100,
   II. positioning a facing sheet on each face of the mat,
   III. passing the facing sheets having the mat and the foam-forming mixture there between through the nip of two rotating rolls,
   the mat of glass fibers being further characterized by
      A. the glass fibers being arranged in layers,
      B. the glass fibers within each layer being long, straight and substantially parallel, and
      C. the glass fibers in each layer being at an acute angle to the glass fibers in each next adjacent layer, and
   IV. permitting the mat of glass fibers to expand under the sole influence of the expansion of the foam-forming mixture.

2. The process of claim 1 wherein the organic polyisocyanate is polymethylene polyphenyl isocyanate.

3. The process of claim 2 wherein the polymethylene polyphenyl isocyanate is a mixture of those of Formula I:

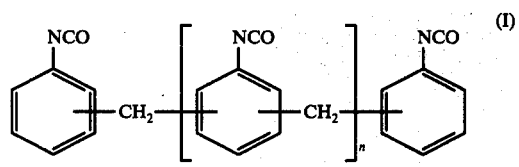

wherein $n$ is an integer from 0 to 8 inclusive.

4. The process of claim 3 wherein the polymethylene polyphenyl isocyanate has a functionality of at least 2.1.

5. The process of claim 3 wherein the polymethylene polyphenyl isocyanate has an equivalent weight of 120 to 180.

6. The process of claim 3 wherein the polymethylene polyphenyl isocyanate has a viscosity between 100 and 4,000 centipoises.

7. The process of claim 1 wherein the diol is one of Formula II:

$$HO-R^1-OH \qquad (II)$$

wherein $R^1$ is selected from the group consisting of lower alkylene and lower alkoxyalkylene.

8. The process of claim 1 wherein the diol consists essentially of diethylene glycol.

9. The process of claim 1 wherein the equivalent ratio of A:B is 2:1 to 6:1.

10. The process of claim 1 wherein the mat of glass fibers has an initial thickness less than 1 and ½ times the separation of the facing sheets at the nip of the two rotating rolls.

11. The process of claim 1 wherein the mat of glass fibers has a low loft such that pressure applied to the faces of the mat will not substantially reduce the thickness of the mat.

12. The process of claim 1 wherein the fibers forming the mat are wetable by the foam-forming mixture to the extent that the foam-forming mixture will penetrate and completely fill the interstices between the glass fibers of the mat.

13. The process of claim 1 wherein the glass fibers of the mat are arranged in layers which are parallel to the faces of the mat.

14. The process of claim 1 wherein the glass fibers in each layer of the mat are at an angle of less than 60° to the glass fibers in each of the next adjacent layers.

15. The process of claim 1 wherein the glass fibers are attached to one another by an amount of fiber binder sufficient to make the mat of glass fibers dimensionally stable but insufficient to fill the interstices between the glass fibers.

16. The process of claim 1 wherein the mat of glass fibers is included in an amount sufficient to insure the continued structural integrity of the structural laminate when the laminate is exposed to open flame.

17. A process for producing a structural laminate comprising the steps of:
   I. contacting a thin, substantially incompressible mat of glass fibers with a foam-forming mixture comprising:
      A. a mixture of polymethylene polyphenyl isocyanates of Formula I:

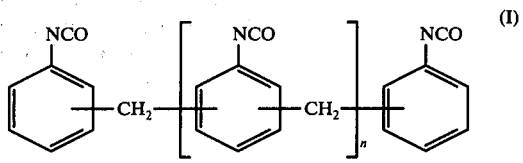

wherein $n$ is an integer from 0 to 8 inclusive, and
      B. a diol having an equivalent weight of 30 to 100 of Formula II:

wherein $R^1$ is selected from the group consisting of lower alkylene and lower alkoxyalkylene.
   wherein the equivalent ratio of A:B is 2:1 to 6:1,
   II. positioning a facing sheet comprising a metal on each face of the mat,
   III. passing the facing sheets having the mat of glass fibers and the foam-forming mixture there between through the nip of two rotating rolls wherein:
      A. the thickness of the mat remains substantially the same as prior to passing through the nip,
      B. the velocity of the mat is equal to the velocity of the facing sheets,
      C. the glass fibers of the mat are arranged in layers,
      D. the glass fibers within each layer are substantially parallel,
      E. the glass fibers in each layer are at an acute angle to the glass fibers in each next adjacent layer, and
      F. the foam-forming mixture completely fills the interstices between the fibers of the mat, and
   IV. permitting the foam-forming mixture to expand under the influence of heat generated in an exothermic reaction between the components of the mat separating under the sole influence of the expansion of the foam-forming mixture, the layers of fibers in the mat maintaining their same order but being distributed throughout the resultant structural laminate.

18. The process of claim 17 wherein the layers of fibers in the mat are evenly distributed throughout the structural laminate in planes substantially parallel to the planes of the facing sheets.

19. The process of claim 17 wherein the foam-forming mixture cures under the influence of heat added by the controlled introduction of hot air.

20. The process of claim 17 wherein the thickness of the mat prior to passing through the nip is less than 0.1 inches.

21. The process of claim 20 wherein the thickness of the mat prior to passing through the nip is between 0.010 and 0.050 inches.

22. The process of claim 17 wherein the glass fibers have an average length that exceeds five feet.

23. The process of claim 17 wherein the glass fibers in each layer of the mat are at an angle of less than 60° to the glass fibers in each of the next adjacent layers.

24. The process of claim 17 wherein the glass fibers are attached to one another by an amount of fiber binder sufficient to make the mat of glass fibers dimensionally stable but insufficient to fill the interstices between the glass fibers and insufficient to resist the separation of the glass fibers under the influence of the expanding foam-forming mixture.

25. The process of claim 17 wherein the mat of glass fibers are included in the amount of 4-24 gms. per board-foot of the resulting structural laminate.

26. A process for producing a structural laminate comprising the steps of:
   I. contacting a thin, substantially incompressible mat of glass fibers with a foam-forming mixture comprising:
      A. a mixture of polymethyl polyphenyl isocyanates of Formula I:

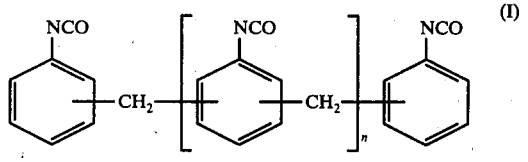

wherein $n$ is an integer from 0 to 8 and the polyisocyanates have an equivalent weight of 120 to 180 and a functionality of 2.5 to 3.5 and the mixture has a viscosity of 250 to 2500 centipoises;
      B. diethylene glycol, wherein the equivalent ratio of A:B is between 3.0:1 and 5.0:1;
      C. a catalyst composition in an amount and of a type sufficient to give the foam-forming mixture a cream time between 15 to 20 seconds and a firm time between 25 and 60 seconds;
      D. fluorotrichloromethane in an amount from 5 to 20 weight percent based on the weight of the foam-forming mixture;
      E. a surfactant in an amount from 0.1 to 2.0 weight percent based on the weight of the foam-forming mixture.
   II. positioning a facing sheet comprising a metal foil between 0.010 and 0.001 inches thick on each face of the mat,
   III. passing the facing sheets having the mat of glass fibers and the foam-forming mixture there between through the nip of two rotating rolls wherein:
      A. the thickness of the mat before passing through the nip of the two rotating rolls is between 0.010 and 0.050 inches,
      B. the thickness of the mat immediately after passing through the nip remains substantially the same as prior to passing through the nip,
      C. the velocity of the mat is equal to the velocity of the facing sheets,
      D. the glass fibers of the mat are arranged in layers,
      E. the glass fibers within each layer are substantially parallel, F. the glass fibers in each layer are at an angle of less than 60° to the glass fibers in each next adjacent layer, G. the glass fibers are attached to one another by an amount of fiber binder sufficient to make the mat of glass fibers dimensionally stable but insufficient to fill the interstices between the glass fibers and insufficient to resist the expansion of the glass fibers under the influence of the expansion of the foam-forming mixture, H. the fibers forming the mat are wetable by the foam-forming mixture to the extent that the foam-forming mixture will penetrate and completely fill the interstices between the glass fibers of the mat, I. the foam-forming mixture completely fills the interstices between the fibers of the mat, J. the glass fibers of the mat have an average length that exceeds five feet.

IV. passing the facing sheets having the mat and the foam forming mixture therebetween from the nip of the two rotating rolls into an expansion zone wherein:

A. the facing sheets having the mat and the foam-forming mixture therebetween are subjected to the influence of heat controlably added by the circulation of hot air for regulating the expansion of the foam-forming mixture, B. the foam-forming mixture expands under the influence of the heat added by the hot air and under influence of heat generated in an exothermic reaction between the components of the foam-forming mixture, C. the layers of the fibers in the mat separate under the sole influence of the expansion of the foam-forming mixture, D. the layers of the fibers in the mat maintain their same order but are distributed throughout the resultant structural laminate in planes substantially parallel to the planes of the facing sheets, V. curing the foam-forming mixture at a temperature of 175° F. to 250° F. until the resultant structural laminate is rigidly self supporting, VI. periodically severing the structural laminate into finite lengths thereby forming discrete panels.

27. A structural laminate comprising:
A. at least one planar facing sheet;
B. a rigid foam integrally attached upon formation of the foam to one surface of the facing sheet, the rigid foam formed from a foam-forming mixture comprising:
   I. an organic polyisocyanate, and
   II. a diol having an equivalent weight between 30 to 100;
C. a mat of glass fibers wherein:
   I. the glass fibers of the mat are distributed substantially evenly throughout the rigid foam,
   II. the glass fibers are straight,
   III. the glass fibers are long,
   IV. the glass fibers of the mat are arranged in layers,
   V. each layer of glass fibers is substantially parallel to the facing sheet.
   VI. the rigid foam completely fills the interstices between the glass fibers of the mat, the glass fibers being held in fixed relationship with respect to each other solely by the rigid foam.

28. The structural laminate of claim 27 wherein there are two parallel facing sheets, one on each face of the rigid foam.

29. The structural laminate of claim 27 wherein the facing sheet is a metal foil between 0.010 and 0.001 inches thick.

30. The structural laminate of claim 27 wherein the surface of the facing sheet obverse to that attached to the rigid foam is decoratively embossed.

31. The structural laminate of claim 27 wherein the organic polyisocyanate is polymethylene polyphenyl isocyanate.

32. The structural laminate of claim 31 wherein the polymethylene polyphenyl isocyanate is a mixture of those of Formula I:

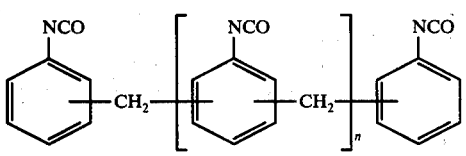

wherein $n$ is an integer from 0 to 8 inclusive.

33. The structural laminate of claim 32 wherein the polymethylene polyphenyl isocyanate has a functionality of at least 2.1.

34. The structural laminate of claim 32 wherein the polymethylene polyphenyl isocyanate has an equivalent weight of 120 to 180.

35. The structural laminate of claim 32 wherein the polymethylene polyphenyl isocyanate has a viscosity between 100 and 4,000 centipoises.

36. The structural laminate of claim 27 wherein the diol is one of Formula II:

$$HO-R^1-OH \qquad (II)$$

wherein $R^1$ is selected from the group consisting of lower alkylene and lower alkoxyalkylene.

37. The structural laminate of claim 27 wherein the diol consists essentially of diethylene glycol.

38. The structural laminate of claim 27 wherein the equivalent ratio of the constituents of the foam-forming mixture I:II is from 2:1 to 6:1.

39. The structural laminate of claim 27 wherein the glass fibers within each layer are substantially parallel to each other.

40. The structural laminate of claim 27 wherein the glass fibers in each layer are an acute angle to the glass fibers in each next adjacent layer.

41. A structural laminate comprising:
A. two planar facing sheets;
B. a rigid foam integrally attached upon formation of the foam between the facing sheets, the rigid foam formed from a foam-forming mixture comprising:
   I. a mixture of polymethylene polyphenyl isocyanates of Formula a:

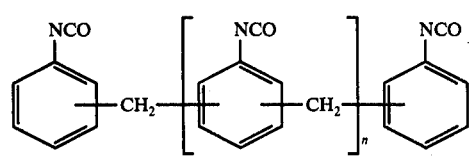

wherein $n$ is an integer from 0 to 8 inclusive, and

II. a diol having an equivalent weight of 30 to 100 of Formula b:

$$HO-R^1-OH \qquad (b)$$

wherein $R^1$ is selected from the group consisting of lower alkylene and lower alkoxyalkylene,
wherein the equivalent ratio of I:II is 2:1 to 6:1, C. a mat of glass fibers wherein:
I. the glass fibers of the mat are distributed substantially evenly throughout the rigid foam,
II. the glass fibers are non-crimped,
III. the glass fibers are long,
IV. the glass fibers of the mat are arranged in layers,
V. each layer of glass fibers is substantially parallel to the facing sheet,
VI. the glass fibers within each layer are substantially parallel,
VII. the glass fibers in each layer are at an acute angle to the glass fibers in each next adjacent layer and
VIII. the foam-forming mixture completely fills the interstices between the fibers of the mat, the fibers being held in fixed relationship with respect to each other solely by the rigid foam.

42. The structural laminate of claim 41 wherein each facing sheet is a metal foil between 0.010 and 0.001 inches thick.

43. The structural laminate of claim 41 wherein the surface of one facing sheet obverse to that attached to the rigid foam is decoratively embossed.

44. The structural laminate of claim 41 wherein the glass fibers have an average length that exceeds 5 feet.

45. The structural laminate of claim 41 wherein the glass fibers in each layer of the mat are at an angle of less than 60° to the glass fibers in each the next adjacent layers.

46. The structural laminate of claim 41 wherein the mat of glass fibers is included in an amount of 4–24 gms. per board foot of structural laminate.

47. The structural laminate of claim 41 wherein the glass fibers in each layer are arranged in non-contiguous undulations in a plane parallel to the facing sheets.

48. A structural laminate comprising:
A. two planar facing sheets wherein:
I. each facing sheet is a metal foil between 0.010 and 0.001 inches thick,
II. the surface of one facing sheet observe to that attached to the rigid foam is decoratively embossed;
B. a rigid foam integrally attached upon formation of the foam to one surface of each facing sheet, the rigid foam formed from a foam-forming mixture comprising:
I. a mixture of polymethyl polyphenyl isocyanates, of Formula a:

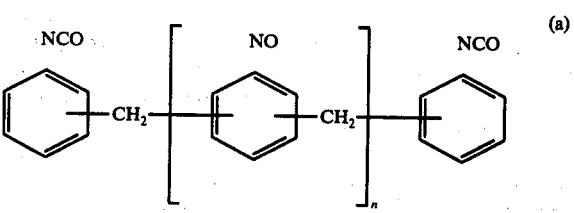

wherein $n$ is an integer from 0 to 8 and the polyisocyanates have an equivalent weight of 120 to 180 and a functionality of 2.5 to 3.8 and the mixture has a vecosity of 250 to 2500 centipoises;
II. diethylene glycol, wherein the equivalent ratio of I:II is between 3.0:1 and 5.0:1;
III. a catalyst composition in an amount and of a type sufficient to give the foam-forming mixture a cream time between 15 and 20 seconds and a firm time between 25 and 60 seconds;
IV. fluorotrichloromethane in an amount from 5 to 20 weight percent based on the weight of the foam-forming mixture;
V. a surfactant in an amount from 0.1 to 2.0 weight percent based on the weight of the foam-forming mixture.

C. a mat of glass fibers wherein:
I. the glass fibers of the mat are distributed substantially evenly throughout the rigid foam,
II. the glass fibers are non-crimped,
III. the glass fibers have an average length that exceeds five feet,
IV. the glass fibers of the mat are arranged in layers,
V. each layer of glass fibers is substantially parallel to the facing sheet,
VI. the glass fibers within each layer are substantially parallel,
VII. the glass fibers in each layer are at an angle of less than 60° to the glass fibers in each next adjacent layer, and
VIII. the foam-forming mixture completely fills the interstices between the fibers of the mat, the fibers being held in fixed relationship to each other solely by the rigid foam,
IX. the mat of glass fibers being included in the amount of 6–20 gms. per board-foot of structural laminate.

* * * * *